United States Patent
Venkatasamy et al.

(10) Patent No.: US 10,298,028 B1
(45) Date of Patent: May 21, 2019

(54) SYSTEMS AND METHODS FOR DYNAMIC CONFIGURATION AND CONTROL OF BUS INTERFACE

(71) Applicant: Amazon Technologies, Inc., Seattle, WA (US)

(72) Inventors: Vidhyananth Ramasamy Venkatasamy, Sunnyvale, CA (US); Thomas Gang Wang, San Jose, CA (US); Roy Reichwein, Los Gatos, CA (US); Mitchell Bernard Skiba, Mountain View, CA (US); David Tuzman, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 487 days.

(21) Appl. No.: 14/731,002

(22) Filed: Jun. 4, 2015

(51) Int. Cl.
*H02J 1/00* (2006.01)
*H02J 7/00* (2006.01)

(52) U.S. Cl.
CPC .............. *H02J 7/0021* (2013.01); *H02J 1/00* (2013.01); *H02J 7/0068* (2013.01)

(58) Field of Classification Search
CPC ........... H02J 7/0021; H02J 1/00; H02J 7/0068
USPC .......................................... 320/128; 307/150
See application file for complete search history.

(56) References Cited

U.S. PATENT DOCUMENTS

| | | | | |
|---|---|---|---|---|
| 5,831,350 A | * | 11/1998 | McConkey | G06F 1/263 307/150 |
| 2005/0162132 A1 | * | 7/2005 | Nagasawa | H02J 9/061 320/128 |
| 2008/0265838 A1 | * | 10/2008 | Garg | G06F 1/266 320/115 |

* cited by examiner

*Primary Examiner* — Hal Kaplan
*Assistant Examiner* — Elim Ortiz
(74) *Attorney, Agent, or Firm* — Eversheds Sutherland (US) LLP (57) ABSTRACT

Method and systems for configuration and control of an inter-integrated circuit (I2C) bus interface are described. An electronic device that may be connected to an external battery device via a modified connector is also described. The connector has multiple interconnect pins, and one of the interconnect pins of the connector is multiplexed to receive data operation and interrupt or signaling operation on a single line. The single line is configured to not only detect a connection with the external battery device, but also to perform data operations including read/write operations between the electronic device and the external battery device.

20 Claims, 6 Drawing Sheets

SYSTEMS AND METHODS FOR DYNAMIC CONFIGURATION AND CONTROL OF BUS INTERFACE

BACKGROUND

A large and growing population of users enjoys entertainment through the consumption of digital media items, such as music, movies, images, electronic books (e-books), and so on. Users employ various electronic devices to consume such media items. Among these electronic devices are electronic book (e-book) readers, smartphones, tablets, phablets, personal digital assistants (PDAs), portable media players, laptops, netbooks, and the like.

These electronic devices have batteries with limited battery life that may need to be charged as often as once a day for uninterrupted functioning of the device. Some electronic devices come with external batteries that may be used to supplement the battery on the device. These external batteries often include connectors used to couple to the electronic device.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily, the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems and methods for reducing a number of interconnect pins or terminals on a connector used to connect an electronic device, such as an electronic reader (e-reader), smartphone or a tablet, to an external battery device. In one example embodiment, the external battery device may include a connector having multiple interconnect pins, such as pogo pins, and the electronic device may have corresponding terminals to connect to the interconnect pins. A first interconnect pin of the connector may be configured to receive a ground (GND) line. A second interconnect pin of the connector may be configured to receive a power (VBUS) line. A third interconnect pin of the connector may be configured to receive a power control line. A fourth interconnect pin may be, for example, a modified serial data terminal or line (SDA) of an inter-integrated circuit (I2C) interface. The SDA line may be multiplexed to receive both data operation as well as an interrupt or signaling operation on the same line, thereby reducing a number of interconnect pins on the connector and avoiding a need for two separate interconnect pins to detect the external battery device and perform data operations, respectively.

The device may include an external battery monitor to monitor docking and undocking of the external battery device. The external battery monitor may be part of the system software, hardware, firmware or combinations thereof. The device may be able to detect docking and undocking of an external battery device as well as perform data operations, such as reading from or writing to the external battery device, on the same SDA line or terminal. Data operations may include exchange of fuel gauge or battery charge information to or from the external battery device, or power flow data between the device and the external battery device when a power source, such as a universal serial bus (USB), is connected to the device.

Although example embodiments are described with reference to an I2C serial data terminal or line (SDA), the disclosure is not limited as such and the methods and systems described may be applied to any bus interface including 1-wire and the serial clock line (SCL) of an I2C interface.

Illustrative Device and Operation

Figure 1:
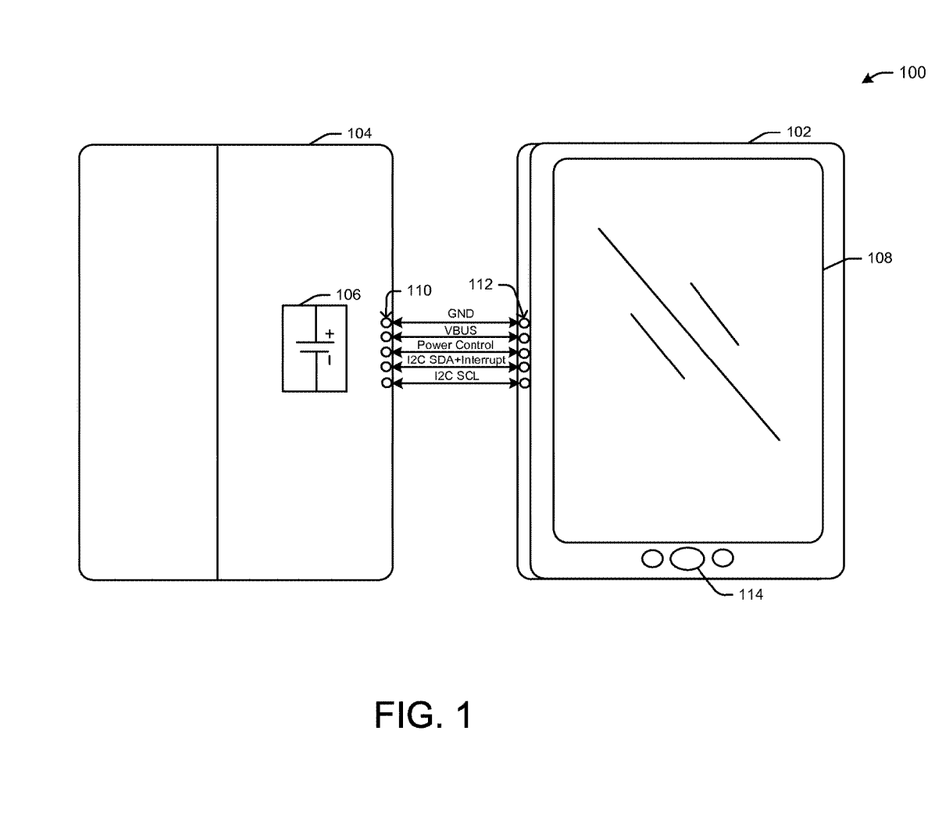
FIG. 1 is a schematic diagram illustrating an example bus interface between an electronic device and an external battery device in accordance with one or more example embodiments of the disclosure.

FIG. 1 is a schematic diagram of a system 100 illustrating an example connection interface between a mobile device 102 and an external battery device 104 in accordance with one or more example embodiments of the disclosure. Device 102 may be any electronic device such as an electronic reader (e-reader), a smartphone, a tablet, a phablet, or any variation thereof. Device 102 may include a display screen 108, which may be used by a user to read or consume contents being displayed thereon. Device 102 may include one or more control devices 114 which may be used to control the operation of the device 102, such as navigating the content being displayed on the display screen 108 or to control the settings of the display screen 108 according to a user's preference. In addition, device 102 may include other devices for interacting with the user, such as a microphone, speaker, touch display, camera, etc. Device 102 may also include an internal battery (not shown) which may provide power to various components of the device 102.

The external battery device 104 may include a battery 106, which may be operatively coupled to a connector 110 for connecting the external battery device 104 to the device 102. Connector 110 may have, for example, four interconnect pins or conductive elements, each configured to perform a separate function. Device 102 may have a corresponding connector 112 which may be operatively coupled to the internal battery (not shown) on device 102. Connector 112 may include four separate terminals or conductive elements corresponding to the interconnect pins or conductive elements of connector 110. In an illustrative embodiment, a first interconnect pin may be connected to a ground (GND) line, the second interconnect pin may be connected to a power (VBUS) line, the third interconnect pin may be connected to a power control line, the fourth interconnect pin may be connected to an inter-integrated circuit (I2C) serial data terminal or line (SDA), and the fifth interconnect pin may be connected to, for example, a series clock terminal or line (SCL) of the I2C interface. The SDA line of the I2C bus interface may be multiplexed to receive a data operation as well as an interrupt or signal operation. For example, the SDA line may not only detect that the external battery device is docked (connected) or undocked (disconnected), but the devices may also be able to perform data operations including read/write operations on this SDA line. Example systems and methods for multiplexing this I2C interface, and configuring and controlling the interface based on whether or not the external battery device 104 is connected to the device 102 are described in the following example embodiments.

Figure 2:
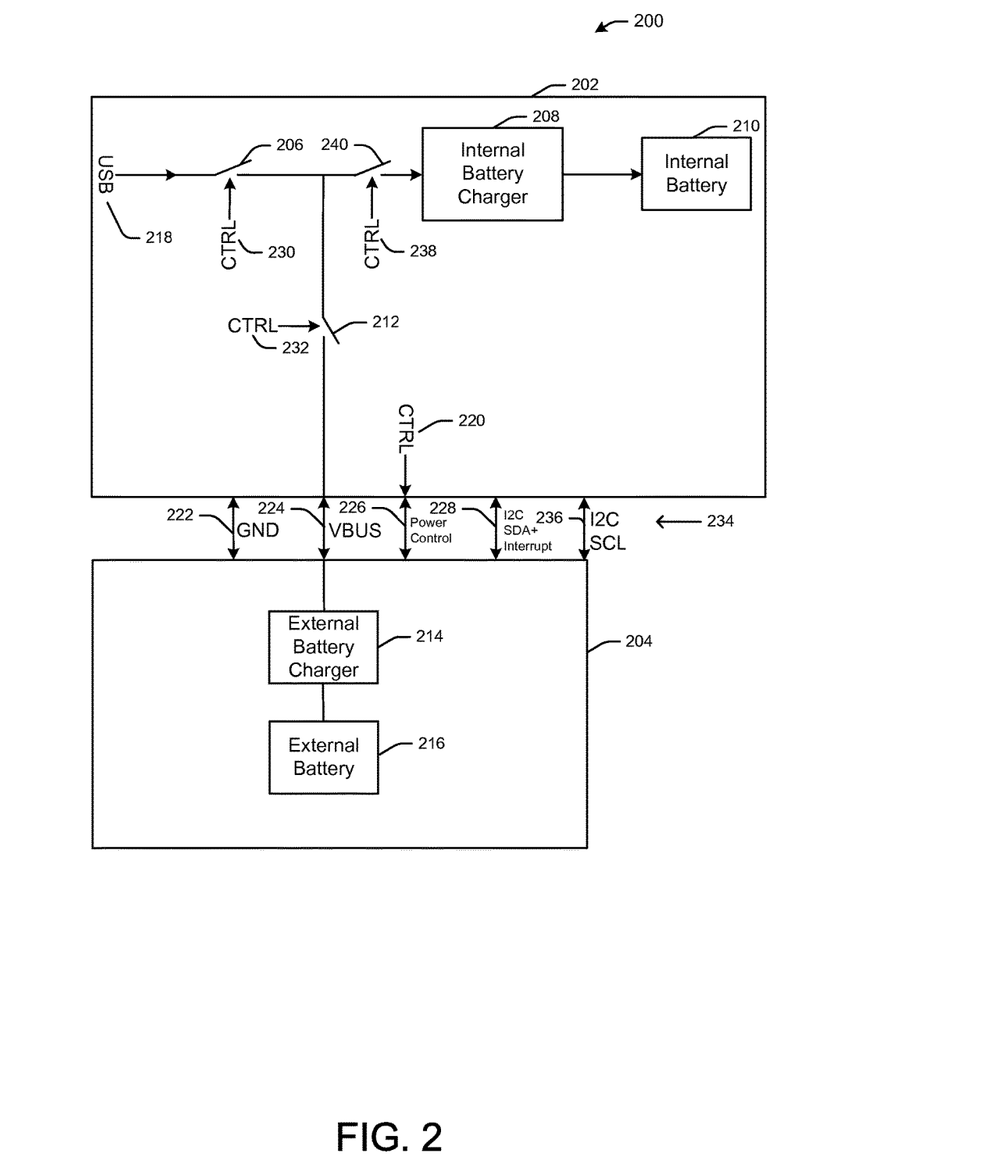
FIG. 2 is a schematic diagram illustrating system architecture of a system including an electronic device and an external battery device connected by an example bus interface in accordance with one or more example embodiments of the disclosure.

FIG. 2 illustrates an example system 200 including an electronic device 202 (for example, device 102 in FIG. 1) and an external battery device 204 (for example, device 104 in FIG. 1), according to one or more example embodiments. The electronic device 202 may include an internal battery 210, which receive power from a charger 208. Charger 208 may include, for example, a power management IC (PMIC) that may distribute and regulate power between various components of the device 202. Power to the charger 208 may be provided by an external power source through a power port 218, which may be for example, a universal serial bus (USB) port or the external battery device 204.

Device 202 may also include control switches 206, 212, 240 that may be controlled by a processor of the device 202 at terminals 230, 232, and 238, respectively. Control switch 206 may control power supply from USB port 218 to charger 208 and control switch 212 may control power flow between the device 202 and the external battery device 204. Control switch 240 may be used to direct power from the USB power source to the internal battery charger 208 or to the external battery device 204. USB port 218 may provide power suitable for charging the devices, for example, a 5V line. External battery device 204 may include an external battery 216, which may be coupled to an external battery charger 214 for receiving power from and sending power to the device 202. Charger 214 may be a charger, for example, with an on-the-go (OTG) provisioning which may enable the external battery device 204 to act as a power provider (e.g., the component providing power to device 202) or power receiver (e.g., the component receiving power from the device 202) depending on the amount of charge in the external battery 216.

The internal battery 210 and the external battery 216 may respectively include any battery, for example, a lithium ion battery, a nickel cadmium battery, or a lithium polymer battery. In addition, the internal battery 210 and the external battery 216 may have different power capacities. For example, internal battery 210 may be a 3 to 4.2V battery and the external battery 216 may be a 3 to 4.5V battery. However, since the battery life of the internal battery 210 may be limited, the external battery 216 may be used to supplement the power provided by the internal battery 210.

Device 202 and external battery device 204 may be connected via a connector 234 to transfer power between the external battery device 204 and the device 202. Connector 234 may comprise a plurality of interconnect pins, for example, pogo pins, which may form a bus interface between the device 202 and the external battery device 204. A first interconnect pin or terminal 222 may be connected to a ground (GND) line, a second interconnect pin or terminal 224 may be connected to a power (VBUS) line, a third interconnect pin or terminal 226 may be connected to a power control line, a fourth interconnect pin or terminal 228 may be connected to an I2C SDA line, and a fifth interconnect pin or terminal 236 may be connected to an I2C SCL line. The third interconnect pin 226 may be coupled to a control terminal 220 that is in communication with the processor to control the power control line 226 between the device 202 and the external battery device 204.

The SDA line on the I2C interface 228 may be multiplexed to receive both data operation as well as an interrupt or signaling operation, thereby reducing a number of interconnect pins on the connector and avoiding a need for two separate interconnect pins to detect the external battery device 204 and perform data operations, respectively. Using this I2C SDA line the device may be able to detect docking and undocking of an external battery device 204 as well as perform data operations, such as reading from or writing to the external battery device 204, on the same SDA line. Data operations may include exchange of fuel gauge or battery charge information to or from the external battery device, or power flow data between the device and the external battery device when a power source, such as a universal serial bus (USB), is connected to the device.

Figure 3:
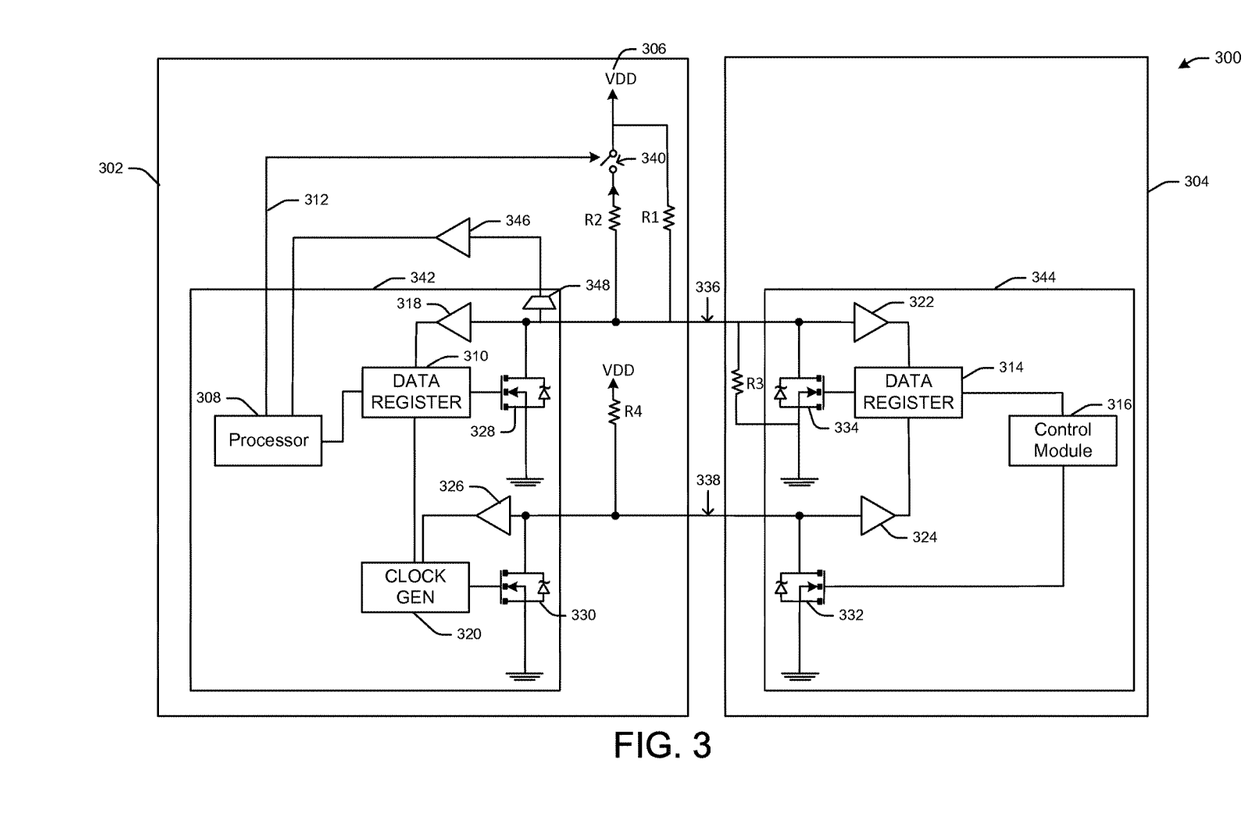
FIG. 3 is a circuit diagram of an illustrative system including an electronic device and an external battery device connected by an example bus interface in accordance with one or more example embodiments of the disclosure.

Turning now to FIG. 3, illustrated is an example system 300 including an electronic device 302 and external battery device 304, according to one or more example embodiments. The device 302 and external battery device 304 may be connected via interfaces 336, 338, which may include a SDA line 336 and an SCL 338. The electronic device 302 may include an I2C master device 342 and the external battery device 304 may include an I2C slave device 344. The master device can be the one that initiates and terminates the I2C bus transaction, and the one that generates all clock pulses. The slave device can be the one that listens for its address to be called and responds as necessary.

Device 302 may include two or more N-channel enhancement-mode MOSFETs 328, 330 where the conductive channel may be formed when a gate-source voltage is applied that is in excess of a threshold voltage. Device 302 may also include two or more data buffer amplifiers 318, 326 which may be used to amplify the signals received on lines 336 and 338, respectively. Device 302 may also include an interrupt handler 346, which may be operatively coupled to a multiplexer 348, as shown in FIG. 3. Clock generator 320 may generate clock pulses at a regular interval, and the data may be placed on SDA 336 by the master device 342. Data register 310 may store data exchanged between the master device 342 and slave device 344. MOSFET 328, which may be grounded in a default state, may act as a switch to control read and write operations to and from the data register 310 on SDA line 336. Processor 308 may include a core logic generator that may be used to generate the logic driving the master side of the interface depending on whether a read operation is being performed or a write operation.

External battery device 304 may include two or more N-channel enhancement-mode MOSFETs 332, 334 where the conductive channel may be formed when a gate-source voltage is applied that is in excess of a threshold voltage. Device 304 may also include two or more data buffer amplifiers 322, 324 which may be used to amplify the signals received on lines 336 and 338, respectively. Data register 314 may store data exchanged between the master device 342 and slave device 344. MOSFET 334, which may be grounded in a default state, may act as a switch to control read and write operations to and from the data register 314 on SDA line 336. Control module 316 may include a core logic generator may be used to generate the logic driving the slave side of the interface depending on whether a read operation is being performed or a write operation. Messages exchanged between the two devices 302, 304 may include an address frame, where the master (device 342) indicates the slave (external battery device 344) to which the message is being sent, and one or more data frames, which may be 8-bit data messages passed from master to slave or vice versa. Data may be placed on the SDA line 336 after SCL 338 goes low, and may be sampled after the SCL 338 line goes high. To initiate the address frame, the master device 342 leaves SCL 338 high and pulls SDA 336 low. This puts slave device 304 on notice that a transmission is about to start. The address frame may always be first in any new communication sequence. For a 7-bit address, the address may be clocked out most significant bit (MSB) first, followed by a R/W bit indicating whether this is a read (1) or write (0) operation. The 9th bit of the frame may be the NACK/ACK bit. This can be the case for all frames (data or address). Once the first 8 bits of the frame are sent, the receiving device is given control over SDA. If the receiving device does not pull the SDA line low before the 9th clock pulse, it can be inferred that the receiving device either did not receive the data or did not know how to parse the message. In that case, the exchange halts, and the master of the system (device 302) decides how to proceed. After the address frame has been sent, data can begin being transmitted. The master 342 may simply continue generating clock pulses at a regular interval, and the data may be placed on SDA 336 by either the master 342 or the slave 344, depending on whether the R/W bit indicated a read or write operation. The number of data frames may be arbitrary, and the slave device 344 may auto-increment the internal register, meaning that subsequent reads or writes may come from the next register in line. Once all the data frames have been sent, the master may generate a stop condition. Stop conditions may be defined by a 0→1 (low to high) transition on SDA 336 after a 0→1 transition on SCL 338, with SCL 338 remaining high. During normal data writing operation, the value on SDA 336 should not change when SCL 338 is high, to avoid false stop conditions.

The I2C interface between the device 302 and external battery device 304 may include two bidirectional 'open-drain' lines 336, 338, meaning that they can pull the corresponding signal line low, but cannot drive it high. Thus, there can be no bus contention where one device is trying to drive the line high while another tries to pull it low, eliminating the potential for damage to the drivers or excessive power dissipation in the system. The two lines may include a serial data terminal or line (SDA) 336 and a serial clock line (SCL) 338. SDA line 336 may include a pull-up resistor R2 on it to restore the signal to high when no device is asserting it low. Similarly, SCL line 338 may have a pull-up resistor R4 on it to restore the signal to high when no device is asserting it low. The pull-up resistors R2, R4 may be connected to a VDD_IO input 306 from device 302. Typical voltages for VDD may be +5 V or +3.3 V although systems with other voltages may also be applicable. The I2C bus speed may be anywhere from 10 kHz to 5 MHz. The clock signals may be generated by the current bus master (device 342). I2C interface 336, 338 may be similar to interconnect pin or terminals 228, 236 shown in FIG. 2.

According to one example embodiment, SDA line 336 may be multiplexed to reduce an interconnect pin count and to perform the operations of interrupt, for example identifying when the battery device 304 is connected to the device 302, and data, for example reading from writing data to the external battery device 304. The device 302 may include a first resistor R1 that may be operatively coupled to the SDA line 336. The device 302 can also include a second resistor R2 that may be operatively coupled to a switch 340 adapted to connect or disconnect the second resistor R2 from a voltage source, such as a VDD_IO input 306 of the device 302. The first resistor R1 is connected in parallel to the second resistor R2 and has higher resistance than the second resistor R2. The external battery device 304 may include a third resistor R3 operatively coupled to the SDA line 336, and the third resistor R3 may have a higher resistance than the second resistor R2 but lower than the first resistor R1.

When the external battery device 304 is connected to the device 302, the processor receives an interrupt signal-pull down of the SDA line 336, by the third resistor R3, to a logic low voltage to transition the SDA line 336 from initial logic high level. A logic low voltage may be anywhere from 0V to ⅓ VDD or from 0V to a threshold voltage (Vth_low), below which a signal may be considered a logic low voltage. Similarly, a logic high voltage may be anywhere from ⅔ VDD to VDD or from a threshold voltage (Vth_high) to VDD, where the threshold voltage (Vth_high) may be used to define a logic high voltage. Once the processor gets the interrupt, the processor may control mux 348 to toggle between a data operation mode and an interrupt or signal operation mode as needed. For example, the processor can send a second signal to close the switch 340 to connect the second resistor R2 to a VDD, and pull up the SDA line 336 from the logic low voltage, held low by the third resistor R3, to the logic high voltage to transition the SDA line 336 to a data operation mode. At the same time, control mux 348 to disconnect SDA line 336 from reaching interrupt handler 346. Once the data communication finishes, the processor can send control signal via 312 to open switch 340 and put the device to interrupt mode. Similarly, when the external device 304 has been disconnected form the device 302, the processor receives a interrupt signal on SDA line 336 that transitioned from logic low level (held down by R3) to logic high level due to disconnection of R3. In this example embodiment, the resistance of the first resistor is always greater than the resistance of the third resistor, and the resistance of the third resistor is always greater than the resistance of the second resistor. For example, the resistance of the first resistor may be 470 k Ohm, the resistance of the second resistor may be 4.7 k Ohm, and the resistance of the third resistor may be 47 k Ohm.

Although example embodiments are described with reference to the SDA line 336, the disclosure is not limited as such and the methods and systems described may be applied to any bus interface including 1-wire and the SCL line 338 of the I2C interface 300.

Illustrative Processes

Figure 4:
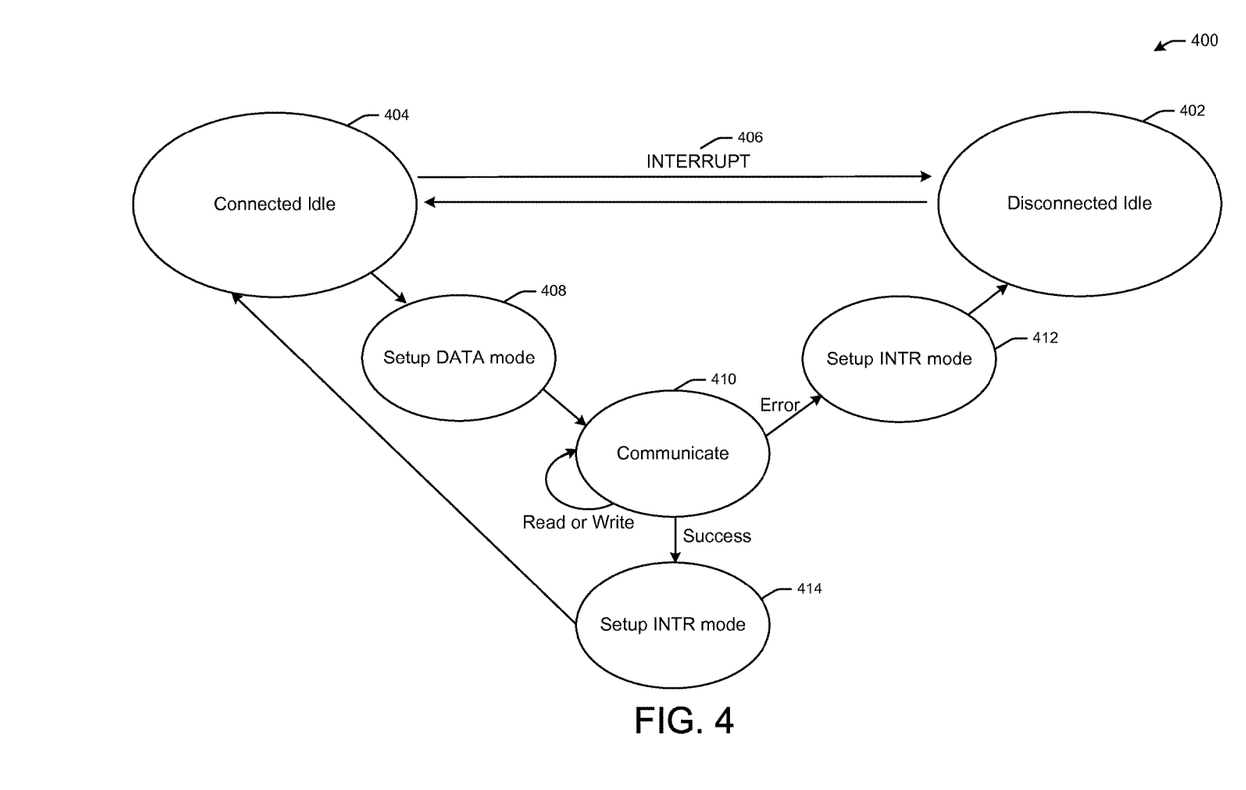
FIG. 4 is a process flow diagram of an illustrative method for configuring and controlling an example bus interface between an electronic device and an external battery device in accordance with one or more example embodiments of the disclosure.

FIG. 4 is a process flow diagram of an illustrative method 400 for configuring and controlling an example I2C interface in a mobile device in accordance with one or more example embodiments of the disclosure. At block 406, the system or device 102, 202, 302 may initiate the external battery monitor in an interrupt mode of the device where the SDA line on the I2C interface between the device and external battery is pulled low. The external battery monitor may be running as software including one or more processes stored in one or more memories of the device. Additionally or alternatively, the external battery monitor may be set up as hardware, firmware, or combinations thereof. The device may initiate the external battery driver so the device may be able to recognize when the external battery device is connected to the device. At block 404, the device may determine when the external battery device is docked (connected) and at block 402 the device may determine when the external battery device is undocked (disconnected). When the external battery device is not undocked (disconnected), the device is waiting a dock event, or for example, waiting to detect that the external battery device has been connected. On the hardware side, the processor sends a signal to pull down the SDA line, using the resistor R3, to a logic low voltage to transition the SDA line to an interrupt operation mode. According to one example embodiment, when the device enters an interrupt mode the processor sends a signal to pull down the SDA line, using the resistor R3, to a logic low voltage to transition the SDA line to an interrupt operation mode. The processor may check the dock line state to determine if the external battery device is docked or undocked. If the battery device is docked, then the line state would be indicated as being LO (low) and if the battery device is undocked, then the line state would be indicated as being HI (high). However, if the processor determines that the external battery device is docked, it changes the dock status as docked. When the battery device is docked, the processor changes the interrupt trigger to HI so the line can be used for interrupt operation mode. If the processor determines the dock line state to be HI, then the processor may change the dock status to undocked, and change the interrupt trigger to LO line state. Changing the interrupt trigger to LO line state stops the battery monitor process, and the processor waits for the external battery device docking event.

At block 404, the processor determines whether the device needs to perform a read or write operation to or from the external battery device. If the processor determines that there is no data or information to be read from or written to the external battery device, then the process flows back to block 404, where the device is basically monitoring, in an interrupt mode, whether the external battery device is docked or undocked. Alternatively, if the processor determines that a read or write operation needs to be performed with the external battery device to exchange, for example fuel gauge information or battery charge information, then the processor may configure a data mode on the SDA line of the I2C interface at block 408. As part of the configuration of the data mode, for example, the processor can send a second signal to close the first switch 340 to connect the second resistor R2 to a logic high voltage, and pull up the SDA line from the logic low voltage, held low by resistor R3, to the logic high voltage to transition the SDA line to a data operation mode.

After the device transitions to the data operation mode, the device may perform one or more data transactions with the external battery device at block 410. For example, the processor may read a plurality of parameters from the external battery device. For example, the processor may read the fuel gauge or battery charge information from the external battery device, and write to the external battery device the fuel gauge or battery charge information from the device itself. Alternatively or additionally, the device may detect that a power source may be connected to the device, and may exchange information about how the power may have to distributed between the external battery device and the device. In the event the processor is unable to read or write this data to or from the external battery device, the processor may generate an error message and periodically notify the user. The notification can be periodic or may be based on a type of the error occurred. Alternatively or additionally, the processor may also maintain error counters for periodic notification to the user. If the device is successful in reading or writing the data at blocks 410, then the processor performs one or more housekeeping activities based on the data read. For example, the processor may send power supply event information to the external battery device, as necessary. Housekeeping activities may also include exchanging for example charge information or information about charge cycles experienced by the device or the external battery device. After the data read and/or write operation between the device and the external battery device is complete, the device may return to its default interrupt operation mode at block 414. At this point, the process returns to block 404 where the device is in an interrupt mode and basically waiting for a dock event or connection by the external battery device.

One or more operations of the method 400 may have been described above as being performed by the device 102, 202, 302 or external battery device 104, 204, 304. It should be appreciated, however, that any of the operations of method 400 may be performed, at least in part, in a distributed manner by one or more other components. Further, the operations of method 400 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 4 may be performed.

Figure 5:
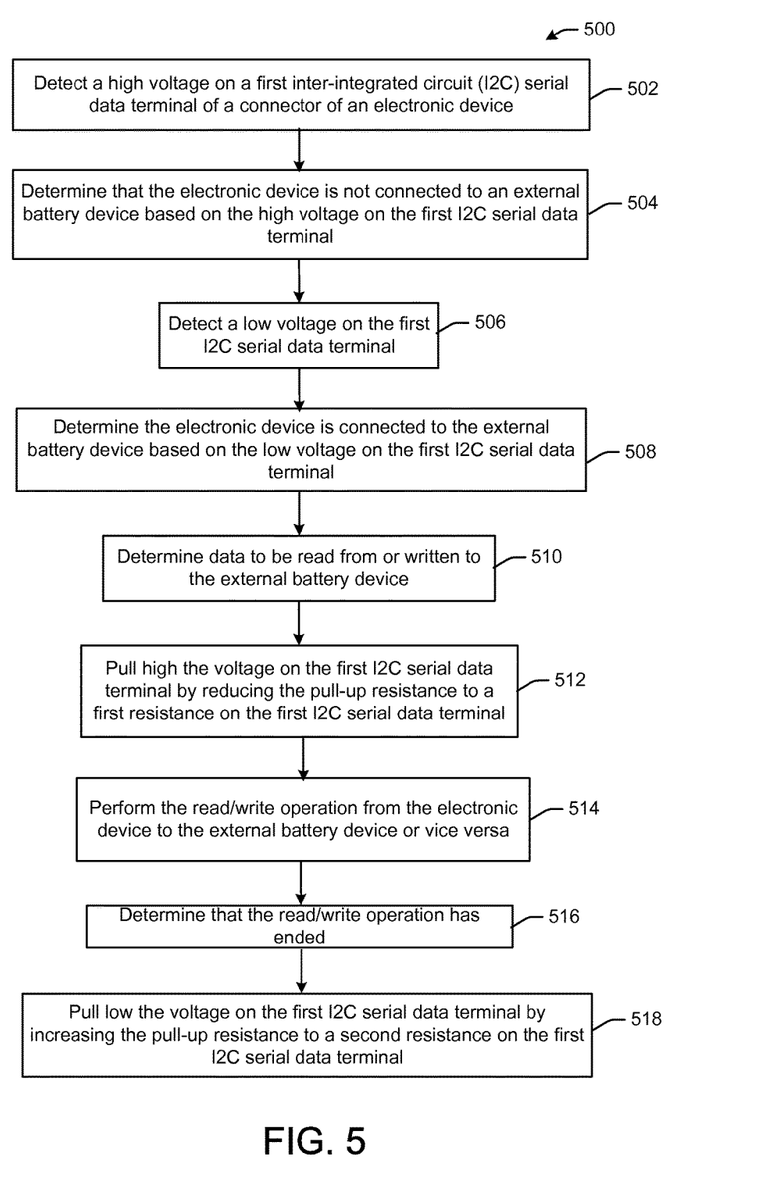
FIG. 5 is a process flow diagram of an illustrative method for configuring and controlling an example bus interface between an electronic device and an external battery device in accordance with one or more example embodiments of the disclosure.

FIG. 5 is a process flow diagram of an illustrative method 500 for multiplexing an I2C bus interface in a mobile device in accordance with one or more example embodiments of the disclosure. Referring to FIG. 5, at block 502, the mobile device may detect a high voltage on a first I2C serial data terminal or line of a connector of the mobile device. At block 504, the mobile device may determine based on the high voltage on the first I2C serial data terminal or line that the external battery device is not connected to the mobile device. At block 506, the mobile device may detect a low voltage on the first I2C serial data line. At block 508, the device may determine based on the low voltage on the first I2C serial data line the external battery device is connected to the mobile device. The first I2C serial data line may be in electric connection with a second I2C serial data line of the external battery device, and the second I2C serial data line may be connected to a pull-down resistor that pulls the high voltage on the first I2C serial data line of the mobile device to the low voltage when connected to the external battery device. At block 510, the device may determine that data is to be read or written from or to the external battery device. At this point, the device may pull high the voltage on the first I2C serial data line by reducing a pull-up resistance to a first resistance on the first I2C serial data line at block 512. The first resistance may be less than a resistance of the pull-down resistor. Once the device has transitioned to a data operation mode, the device may perform a read or write operation from or to the external battery device at block 514. At block 516, the device may determine that the read or write operation has ended, and the processor may pull low the voltage on the first I2C serial data line by increasing the pull-up resistance to a second resistance on the first I2C serial data line. The second resistance may be more than resistance of the pull-down resistor. At this point, the mobile device may detect the high voltage on the first I2C serial data line, and determine based on the high voltage on the first I2C serial data line the external battery device has been disconnected from the e-reader device.

One or more operations of the method 500 may have been described above as being performed by the device 102, 202, 302 or external battery device 104, 204, 304. It should be appreciated, however, that any of the operations of method 500 may be performed, at least in part, in a distributed manner by one or more other components. Further, the operations of method 500 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 5 may be performed.

The terms 'terminal' and 'line' are interchangeably used throughout the disclosure. However, it may be apparent to one of ordinary skill in the art that the terms 'terminal' and 'line' refer to a conductive element, such as an electrical contact or connection, and may include other conductive elements such as pins, leads, contacts, and electrical lines.

Illustrative Device Architecture

Figure 6:
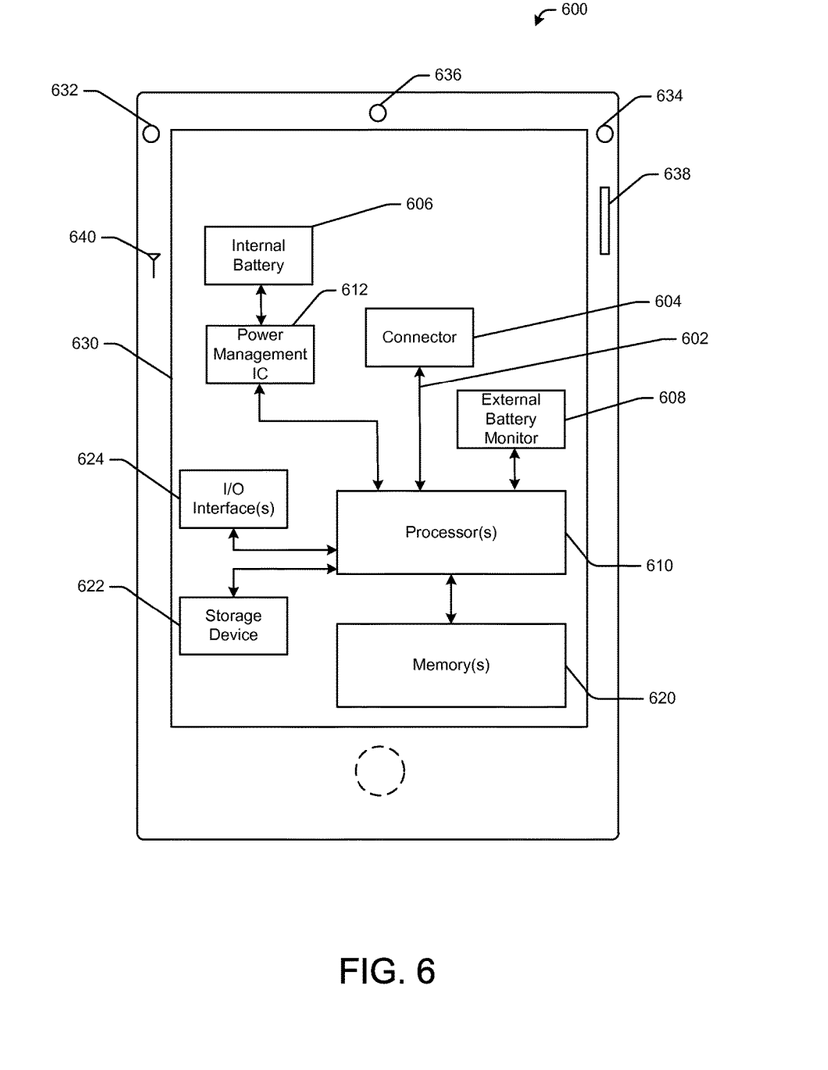
FIG. 6 is a diagram of an illustrative physical implementation of an electronic device in accordance with one or more example embodiments of the disclosure.

FIG. 6 is a schematic diagram illustrating an example user device 600 with a connector including a connector 604 as described in the above example embodiments. In operation, the user device 600 may include computer-readable and computer-executable instructions that reside on the user device 600, as is discussed further below. Connector 604 may be similar to the connector 234 described in FIG. 2, for example, and may include SDA line 336 and SCL line 338 as described in FIG. 3, or any of the above example embodiments. The user device 600 may include an address/data bus 602 for conveying data among components of the user device 600. Each component within the computing device 600 may also be directly connected to other components in addition to (or instead of) being connected to other components across the bus 602.

The I2C interface 604 may be included within the user device 600, such as a mobile communications device, a personal electronic device, or any other portable electronic device. The user device 600 may include, but is not limited to, a personal computer, a desktop computer, a notebook computer, a laptop computer, a personal digital assistant, an electronic book (ebook) reader, a tablet computing device, a pad computing device, a smartphone, wearable devices, or combinations thereof. The user device 600 may include one or more application processor(s) 610 and one or more memory(s) 620. The user device 600 may also include an internal battery 606, which may be similar to the battery 210 described in FIG. 2. The internal battery 606 may provide power to a power management IC 612, which may include a battery management module for distributing power between various components of the user device 600.

In some example embodiments, the processors 610 of the user device 600 may be implemented as appropriate in hardware, software, firmware, or combinations thereof. Software or firmware implementations of the processors 610 may include computer-executable or machine-executable instructions written in any suitable programming language to perform the various functions described. Hardware implementations of the processors 610 may be configured to execute computer-executable or machine-executable instructions to perform the various functions described. The one or more processors 610 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 600 may also include a chipset (not shown) for controlling communication between the one or more processors 610 and one or more of the other components of the user device 600. The one or more processors 610 may also include one or more application specific integrated circuits (ASICs) or application specific standard products (ASSPs) for handling specific data processing functions or tasks.

The memory/storage 620 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, non-volatile magnetoresistive (MRAM), or combinations thereof.

The memory 620 may store program instructions that are loadable and executable on the processor(s) 610, as well as data generated or received during the execution of these programs. The memory 620 may include one or more operating systems (O/S) and one or more application software that may be executed by the processors 610 to control the user device 600 and the I2C interface 604. The memory 620 may also provide temporary "working" storage at runtime for any applications being executed on the processors(s) 610. The computer instructions may be stored in a non-transitory manner in non-volatile memory 620, storage 622, or an external device. Alternatively, some or all of the executable instructions may be embedded in hardware or firmware in addition to or instead of software. The user device 600 may also include external battery monitor 608, which may be operatively coupled to the connector 604 and the processor 610. External battery monitor 608 may be implemented as appropriate in hardware, software, firmware, or combinations thereof. Software or firmware implementations of the processors may include computer-executable or machine-executable instructions written in any suitable programming language to perform the various functions described.

The user device 600 may include input/output device interfaces 624. A variety of components may be connected through the input/output device interfaces 624, such as a display or display screen 630 having a touch surface or touchscreen, an audio output device for producing sound, such as speaker(s) 632, one or more audio capture device(s), such as a microphone or an array of microphones 634, one or more image and/or video capture devices, one or more haptic units 638, and other components. The display 630, speaker(s) 632, microphone(s) 634, haptic unit(s) 638, and other components may be integrated into the user device 600 or may be separate.

The display 630 may be a video output device for displaying images. The display 630 may be a display of any suitable technology, such as a liquid crystal display, an organic light emitting diode display, electronic paper, an electrochromic display, a cathode ray tube display, a pico projector or other suitable component(s). The display 630 may also be implemented as a touchscreen and may include components such as electrodes and/or antennae for use in detecting stylus input events or detecting when a stylus is hovering above, but not touching, the display 630.

The input/output device interfaces 624 may also include an interface for an external peripheral device connection such as universal serial bus (USB), FireWire, Thunderbolt, Ethernet port or other connection protocol that may connect to one or more networks. The input/output device interfaces 624 may also include a connection to one or more antennas 640 to connect one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 600 may be any suitable electronic device such as, for example, a desktop or laptop PC, a smartphone, a digital personal assistant, a tablet, a wearable computing device, or the like. In certain example embodiments, the device 600 may include one or more antennas 640 including, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The battery may be any suitable type of battery including, but not limited to, any Li-ion or Li-based battery. Packaging material for the battery may include, without limitation, various tri-laminated combinations of aluminum, graphene, nylon and PET or other hermetic and sealable packaging materials or combinations thereof.

Referring now to other components of the device 600, the bus(es) may include at least one of a system bus, a memory bus, an address bus, or a message bus, and may permit exchange of information (e.g., data (including computer-executable code), signaling, etc.) between various components of the device 600. The bus(es) may include, without limitation, a memory bus or a memory controller, a peripheral bus, an accelerated graphics port, and so forth. The bus(es) may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCM-CIA) architecture, a Universal Serial Bus (USB) architecture, and so forth.

The memory(s) 620 of the device 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 620 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 620 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage device 622 may include removable storage and/or non-removable storage including, but not limited to, magnetic storage, optical disk storage, solid-state storage, and/or tape storage. The data storage 622 may provide non-volatile storage of computer-executable instructions and other data. The memory 620 and the data storage 622, removable and/or non-removable, are examples of computer-readable storage media (CRSM) as that term is used herein.

The data storage 622 may store computer-executable code, instructions, or the like that may be loadable into the memory 620 and executable by the processor(s) 610 to cause the processor(s) 610 to perform or initiate various operations. The data storage 622 may additionally store data that may be copied to memory 620 for use by the processor(s) 610 during the execution of the computer-executable instructions. Moreover, output data generated as a result of execution of the computer-executable instructions by the processor(s) 610 may be stored initially in memory 620, and may ultimately be copied to data storage 622 for non-volatile storage.

More specifically, the data storage 622 may store one or more operating systems (O/S) and one or more applications, program modules, or the like. Any applications stored in the data storage 622 may be loaded into the memory 620 for execution by the processor(s) 610. Further, any data (not shown) stored in the data storage may be loaded in to the memory 620 for use by the processor(s) 610 in executing computer-executable code.

The processor(s) 610 may include any suitable processing unit capable of accepting data as input, processing the input data in accordance with stored computer-executable instructions, and generating output data. The processor(s) 610 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 610 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 610 may be capable of supporting any of a variety of instruction sets.

Referring now to other illustrative components depicted as being stored in the data storage 622, the O/S may be loaded from the data storage 622 into the memory 610 and may provide an interface between application(s) executing on the device 600 and hardware resources of the device 600. More specifically, the O/S may include a set of computer-executable instructions for managing hardware resources of the device 600 and for providing common services to application programs (e.g., managing memory allocation among various application programs). The O/S may include any operating system now known or which may be developed in the future including, but not limited to, any server operating system, any mainframe operating system, or any other proprietary or non-proprietary operating system.

The input/output (I/O) interface(s) 624 may facilitate the receipt of input information by the device 600 from one or more I/O devices as well as the output of information from the device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 600 or may be separate. The I/O devices may further include, for example, any number of peripheral devices such as data storage devices, printing devices, and so forth.

The I/O interface(s) 624 may also include an interface for an external peripheral device connection such as universal serial bus (USB), FireWire, Thunderbolt, Ethernet port or other connection protocol that may connect to one or more networks. The I/O interface(s) 624 may also include a connection to one or more of the antenna(s) 640 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 600 may further include one or more network interfaces via which the device 600 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The sensor(s)/sensor interface(s) 632, 634, 636, may include or may be capable of interfacing with any suitable type of sensing device such as, for example, ambient light sensors, inertial sensors, force sensors, thermal sensors, image sensors, magnetometers, and so forth. Example types of inertial sensors may include accelerometers (e.g., MEMS-based accelerometers), gyroscopes, and so forth.

The antenna(s) 640 may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like. The antenna(s) may be communicatively coupled to one or more transceivers or radio components (not shown) to which or from which signals may be transmitted or received.

As previously described, the antenna(s) 640 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 640 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 6 GHz channels (e.g. 802.11n, 802.11ac), or 60 GHZ channels (e.g. 802.11ad). In alternative example embodiments, the antenna(s) 640 may be configured to transmit or receive radio frequency signals within any suitable frequency range forming part of the unlicensed portion of the radio spectrum.

The antenna(s) 640 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) may include any suitable radio component(s) for—in cooperation with the antenna(s) 640—transmitting or receiving radio frequency (RF) signals in the bandwidth and/or channels corresponding to the communications protocols utilized by the device 600 to communicate with other devices. The transceiver(s) may include hardware, software, and/or firmware for modulating, transmitting, or receiving—potentially in cooperation with any of antenna(s) 640—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) may further include hardware, firmware, or software for receiving GNSS signals. The transceiver(s) may include any known receiver and baseband suitable for communicating via the communications protocols utilized by the device 600. The transceiver(s) may further include a low noise amplifier (LNA), additional signal amplifiers, an analog-to-digital (A/D) converter, one or more buffers, a digital baseband, or the like.

It should be appreciated that the device 600 may include alternate and/or additional hardware, software, or firmware components beyond those described or depicted without departing from the scope of the disclosure. More particularly, it should be appreciated that software, firmware, or hardware components depicted as forming part of the device 600 are merely illustrative and that some components may not be present or additional components may be provided in various embodiments.

Various other changes and modifications to the embodiments herein chosen for purposes of illustration will readily occur to those skilled in the art. For example, certain materials for the purposes of bonding and/or castellated contact formation were described, but other materials may also be effective. Further additional intervening layers may be able to be provided while still benefiting from the explained embodiments. Examples were described to aid in understanding. Thus, it was not intended that these examples were the only examples. To the extent that such modifications and variations do not depart from the spirit of the invention, they are intended to be included within the scope thereof. It will be readily understood to those skilled in the art that various other changes in the details, material, and arrangements of the parts and method stages which have been described and illustrated in order to explain the nature of this disclosure may be made without departing from the principles and scope of the disclosure.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   detecting, by an electronic reader (e-reader) device comprising at least one processor and a battery, a logic high voltage on a first inter-integrated circuit (I2C) serial data line of a connector of the e-reader device;
   determining that the e-reader device is not connected to an external battery device, using the logic high voltage on the first I2C serial data line;
   detecting a logic low voltage on the first I2C serial data line;
   determining, by the at least one processor, that the e-reader device is connected to the external battery device, using the logic low voltage on the first I2C serial data line, wherein the first I2C serial data line is electrically coupled with a second I2C serial data line of the external battery device when the e-reader device is connected to the external battery device, and wherein the second I2C serial data line is connected to a pull-down resistor that pulls the logic high voltage on the first I2C serial data line of the e-reader device to the logic low voltage when the e-reader device is connected to the external battery device;
   determining that battery charge data is to be communicated from the e-reader device to the external battery device;
   changing voltage on the first I2C serial data line from the logic low voltage to the logic high voltage by sending, by the at least one processor, a first signal to close a control switch electrically coupled to a first pull-up resistor to place the first pull-up resistor in parallel with a second pull-up resistor;
   communicating the battery charge data from the e-reader device to the external battery device;
   changing the voltage on the first I2C serial data line from the logic high voltage to the logic low voltage;
   detecting the logic high voltage on the first I2C serial data line; and
   determining, by the at least one processor, that the external battery device is disconnected from the e-reader device.

2. The method of claim 1, wherein changing the voltage on the first I2C serial data line from the logic high voltage to the logic low voltage comprises:
   sending, by the at least one processor, a second signal to open the control switch to prevent current flow in the first pull-up resistor so that a pull-up resistance value is equal to the second resistance value of the second pull-up resistor.

3. The method of claim 1, wherein a first resistance value of the first pull-up resistor is less than a second resistance value of the second pull-up resistor.

4. A device comprising:
   a processor;
   a battery configured to provide power to the processor;
   a connector coupled to the battery and configured to receive power from an external component, the connector comprising a plurality of lines, wherein a first line of the plurality of lines is configured to detect when the external component is connected to the device and to perform one or more serial data operations with the external component; and
   a first resistor operatively coupled to the first line and connected in parallel to a second resistor, the second resistor operatively coupled to a switch adapted to connect the second resistor to or disconnect the second resistor from a voltage source;
   wherein the processor is configured to:
     determine that the external component is connected to the connector; and
     send a first signal to open the switch to pull down the first line to a logic low voltage to transition the first line to an interrupt operation mode to detect connection of the external component to the connector.

5. The device of claim 4, wherein the first line is an inter-integrated circuit (I2C) serial data line (SDA), an I2C serial clock line (SCL), or a 1-wire bus interface.

6. The device of claim 4, wherein the processor is further configured to:
   determine, in the interrupt operation mode, a voltage of the first line based at least in part on whether the external component is connected to the connector, the voltage being the logic low voltage when the first line is connected to the external component; and indicate an interrupt trigger status as HIGH when the voltage of the first line is the logic low voltage.

7. The device of claim 4, wherein the processor is further configured to:
receive, in a data operation mode, data pertaining to a battery charge level of the external component; and
generate an error message when the data is not received within a predetermined period of time.

8. The device of claim 4, wherein the processor is further configured to: send a second signal to close the switch to pull up the first line to a logic high voltage to transition the first line to a data operation mode to perform serial data operations.

9. The device of claim 8, wherein the processor is further configured to:
determine that the external component is not connected to the connector; and
send a third signal to open the switch to disconnect the second resistor from the voltage source to pull up the first line to the logic high voltage.

10. The device of claim 8, wherein the processor is further configured to:
determine, in the data operation mode, a voltage of the first line based at least in part on whether the external component is connected to the connector, the voltage being the logic high voltage when the first line is not connected to the external component; and
indicate an interrupt trigger status as LOW when the voltage of the first line is the logic high voltage.

11. The device of claim 4, wherein a first resistance value of the first resistor is greater than a second resistance value of the second resistor.

12. A system comprising:
an electronic device; and
an external battery device removably coupled to the electronic device,
wherein the electronic device comprises:
a processor,
a first battery providing power to the processor,
a first connector comprising:
a first interconnect line configured to receive a first ground line of the electronic device,
a second interconnect line configured to receive a first power line of the electronic device for charging the first battery, and
a third interconnect line utilized by the processor to detect an electrical connection with the external battery device and to communicate serial data with the external battery device, and
a first resistor operatively coupled to the third interconnect line and connected in parallel to a second resistor, the second resistor operatively coupled to a switch adapted to connect the second resistor to or disconnect the second resistor from a voltage source,
wherein the external battery device comprises:
a second battery,
a second connector comprising:
a fourth interconnect line configured to receive a second ground line of the external battery device,
a fifth interconnect line configured to receive a second power line of the external battery device, and
a sixth interconnect line configured to communicate serial data with the electronic device, and a third resistor operatively coupled to the sixth interconnect line,
wherein the first connector is removably connected to the second connector to form electrical connections between the first interconnect line and the fourth interconnect line, between the second interconnect line and the fifth interconnect line, and between the third interconnect line and the sixth interconnect line, and
wherein, when the external battery device is connected to the electronic device, the third interconnect line is pulled down, by the third resistor, to a logic low voltage to transition the third interconnect line to an interrupt operation mode.

13. The system of claim 12, wherein the third interconnect line is an inter-integrated circuit (I2C) serial data line (SDA), an I2C serial clock line (SCL), or a 1-wire bus interface.

14. The system of claim 12, wherein the processor is configured to:
determine, in the interrupt operation mode, a voltage of the third interconnect line based at least in part on whether the external battery device is connected to the first connector, the voltage being the logic low voltage when the third interconnect line is connected to the external battery device; and
indicate an interrupt trigger status as HIGH when the voltage of the third interconnect line is the logic low voltage.

15. The system of claim 12, wherein the processor is configured to:
determine, in the interrupt operation mode, a voltage of the third interconnect line based at least in part on whether the external battery device is connected to the first connector, the voltage being a logic high voltage when the third interconnect line is connected to the external battery device; and
indicate an interrupt trigger status as LOW when the voltage of the third interconnect line is the logic high voltage.

16. The system of claim 12, wherein the processor is configured to:
send a second signal to close the switch to pull up the third interconnect line to a logic high voltage to transition the third interconnect line to a data operation mode to perform serial data operations.

17. The system of claim 16, wherein the processor is further configured to:
determine that the electronic device is not connected to the external battery device; and
send a third signal to open the switch to disconnect the second resistor from the voltage source and to pull up the third interconnect line, using the first resistor, to the logic high voltage.

18. The system of claim 16, wherein the processor is further configured to:
write, in the data operation mode, battery charge data to the external battery device.

19. The system of claim 16, wherein the processor is further configured to:
read, in the data operation mode, battery charge data from the external battery device.

20. The system of claim 12, wherein a first resistance value of the first resistor is greater than a second resistance value of the second resistor.

* * * * *